United States Patent
Anjan et al.

(10) Patent No.: US 8,938,719 B2
(45) Date of Patent: Jan. 20, 2015

(54) SYSTEM AND METHOD FOR PERFORMANCE ASSURANCE OF APPLICATIONS

(75) Inventors: Gururaj Anjan, Orissa (IN); Harish Sivasubramanian Iyer, Maharashtra (IN)

(73) Assignee: Tata Consultancy Services Limited (IN)

( * ) Notice: Subject to any disclaimer, the term of this patent is extended or adjusted under 35 U.S.C. 154(b) by 0 days.

(21) Appl. No.: 13/474,358

(22) Filed: May 17, 2012

(65) Prior Publication Data

US 2013/0139130 A1    May 30, 2013

(30) Foreign Application Priority Data

Nov. 30, 2011   (IN) .......................... 3374/MUM/2011

(51) Int. Cl.
G06F 11/36    (2006.01)
G06F 11/34    (2006.01)

(52) U.S. Cl.
CPC .................................... *G06F 11/34* (2013.01)
USPC ........................................................ 717/126

(58) Field of Classification Search
CPC ............... G06F 7/78; G06F 8/00–8/78; G06F 9/44–9/455; G06F 11/36
USPC ................................................. 717/100–178
See application file for complete search history.

(56) References Cited

U.S. PATENT DOCUMENTS

| | | | |
|---|---|---|---|
| 7,080,351 B1* | 7/2006 | Kirkpatrick et al. | 717/102 |
| 2004/0010772 A1* | 1/2004 | McKenna et al. | 717/101 |
| 2004/0123272 A1* | 6/2004 | Bailey et al. | 717/125 |
| 2004/0143811 A1* | 7/2004 | Kaelicke et al. | 717/101 |
| 2008/0256516 A1* | 10/2008 | Chaar et al. | 717/121 |
| 2008/0307387 A1* | 12/2008 | Yoon et al. | 717/110 |

OTHER PUBLICATIONS

Balsamo et al., Model-Based Performance Prediction in Software Development: A Survey, IEEE, 2004.*
Cortellessa et al., Software Lifecycle and Performance Analysis, Model-Based Software Performance Analysis, 2011.*
"Application Performance Engineering: Building Performance Throughout the Application Lifecycle", Shunra Software Ltd., http://www.shunra.com/ape, (May 16, 2012), 2 pgs.
Aziz, Sohel, et al., "Performance Engineering and Global Software Development", Infosys, View Point, (Jan. 2007), 6 pgs.
Menascé, Daniel A., "A Framework for Software Performance Engineering of Client/Server Systems", Proc. 1997 CMG Conference, Dec. 1997, Orlando, FL., (Dec. 1997), 10 pgs.

* cited by examiner

*Primary Examiner* — Wei Zhen
*Assistant Examiner* — Zhan Chen
(74) *Attorney, Agent, or Firm* — Schwegman Lundberg & Woessner, P.A.

(57) ABSTRACT

A method for assuring performance of applications is described herein. According to an implementation, the method includes obtaining at least one performance requirement associated with an application in a pre-development phase of a development lifecycle of the application. The performance requirement is mapped with one or more of functional requirements associated with the application and the performance requirement is analyzed based at least on an operational load expected to be handled by the application during operation. Further, the application is developed based on the performance requirement and the mapping. At least one performance characteristic associated with the application is determined, to compare against the performance requirement assuring performance of the application during operation.

13 Claims, 2 Drawing Sheets

SYSTEM AND METHOD FOR PERFORMANCE ASSURANCE OF APPLICATIONS

CLAIM OF PRIORITY

This application claims the benefit of priority under 35 U.S.C. §119 of Gururaj Anjan, Indian Patent Application Serial Number 3374/MUM/2011, entitled "SYSTEM AND METHOD FOR PERFORMANCE ASSURANCE OF APPLICATIONS," filed on Nov. 30, 2011, the benefit of priority of which is claimed hereby, and which is incorporated by reference herein in its entirety.

TECHNICAL FIELD

The present subject matter relates to application development and deployment and, particularly but not exclusively, to system and method for performance assurance of applications.

BACKGROUND

With the onset of technologization, software applications have replaced tedious human labour in almost all avenues. For example, applications are developed and implemented for carrying out monetary transactions, accounting, travel booking, hotel management, cab management, and a plethora of other such purposes.

Software applications are tested to ensure that the software performs the functions it is designed for. Software applications are tested for functionality, bugs, and glitches in order to determine whether the software applications meet required goals or not. According to the traditional approach followed for application development, functional requirements relating to the application to be developed are obtained. On the basis of the functional requirements, design and architecture of the application is engineered and the application developed.

Further, after the development of the application, the application is tested for functional defects. In order to test the functionality of a software application, functional testing requirements may be gathered. In one approach a functional testing requirement specification is prepared. The functional testing requirement specification is indicative of the properties for which the application needs to be tested. Based on the functional testing requirement specification, test cases may be designed and executed on the software application to verify its functionality. In case execution of the test cases reveal that the software application is not performing in an expected manner, the software application is reported to be malfunction and modified to correct the defects found.

Along with functional testing, the software application can also be tested for quality assurance after development, to achieve validation and reliability estimation of the software application. While the former involves testing the software applications for functionalities, the latter is performed for purposes of performance quality assurance and is generally referred to as performance testing. The process of testing a software application for performance is a trade-off between budget and time, and the required quality of performance of the software application. Unlike functional testing, a systematic and exhaustive performance testing may often be compromised considering the time and costs associated with performance testing.

SUMMARY

This summary is provided to introduce concepts related to system and method for assuring performance of applications. These concepts are further described below in the detailed description. This summary is not intended to identify essential features of the claimed subject matter nor is it intended for use in determining or limiting the scope of the claimed subject matter.

A method for assuring performance of applications is described herein. According to an implementation, the method includes obtaining at least one performance requirement associated with an application in a pre-development phase of the application. The performance requirement is mapped with one or more of functional requirements associated with the application and the performance requirement is analyzed based at least on an operational load expected to be handled by the application during operation. Further, the application is developed based on the performance requirement and the mapping. At least one performance characteristic associated with the application is determined, to compare against the performance requirement for assuring performance of the application during operation.

BRIEF DESCRIPTION OF THE DRAWINGS

The detailed description is described with reference to the accompanying figure(s). In the figure(s), the left-most digit(s) of a reference number identifies the figure in which the reference number first appears. The use of the same reference number in different figure(s) indicates similar or identical items. The features, aspects and advantages of the subject matter will be better understood with regard to the following description, and the accompanying drawings.

DETAILED DESCRIPTION

The present subject matter relates to methods and systems for assuring performance of applications.

Conventional systems and methods for application development involve collection of functional requirements related to an application to be developed, in pre-development phase of software development life cycle. The application is designed and developed considering the functional requirements associated with the application. The further testing and tuning of the application is also achieved to assure conformation of the application with the functional requirements.

In certain conventional approaches for application development, performance parameters to be taken into account during operation of the application are typically considered in a post-development phase of the software development life cycle. In such conventional techniques, the application hence developed might not be compliant with the performance parameters, as required by say a customer for whom the application is developed. Further, if performance of the application during operation does not meet the performance parameters, the incorporation of functionalities related to the performance parameters in the application involves a large amount of rework and usually requires re-engineering the application. As a result, the cost associated with the development of the application increases.

The present subject matter describes methods and systems for assuring performance of applications, according to an implementation of the present subject matter. In an implementation of the present subject matter, performance requirements associated with an application are collected during a pre-development phase of application development. The performance requirements are mapped with functional requirements associated with the application, and at least the performance requirements are analyzed with respect to an operational load that the application is expected to handle and performance targets application is expected to meet during operation. The operational load can include, for example, data load and work load, say number of users using the application at a given time. In one example, the analysis can be done to estimate growth in the amount of data and number of users, which are expected to be handled by the application during the service period. Further, the application is developed on the basis of the performance requirements, the functional requirements, the mapping thereof, and the analysis of the performance requirements. The application is then tested for performance and one or more performance characteristics of the application are obtained as results of the testing. The performance characteristics and the performance requirements can then be used for assuring performance during deployment and launch of the application.

In an implementation, the performance requirements collected for the application can include work load characteristics associated with the application, key transaction characteristics, data load characteristics associated with the application, expected service period of the application, data batch job characteristics associated with the application, data retention period for different data associated with the application, expected availability of the application during operation, and acceptable utilization resources, such as processing power, memory, and network bandwidth, by the application during operation. As a result of the collection of the performance requirements in the pre-development phase of the application, the functionalities associated with the performance aspect can be identified and configured to assure optimized performance of the application during operation. Further, since the performance requirements are considered in the pre-development stage, the application does not undergo any modification for performance assurance after the development. As a result, the cost associated with application development and performance assurance of the application is significantly mitigated. Further, the performance testing of the application provides quality assurance with respect to the performance of the application and also provides a competitive edge to enterprise deploying such applications.

According to an implementation, prior to testing of the application, a testing environment for hosting the application during testing is determined. The testing environment can be determined based on, for example, the production environment in which the application is to be deployed. Further, during the determination of the testing environment, optimization of components of the environment, such as server capacities, memory allocation, disk space allocation, and processing techniques, can be achieved. In addition, test data for use during testing of the application is obtained prior to conducting the test. The test data can be generated based on the performance requirements, the functional requirements, and the estimations relating to operational load e.g. duration for which application is supposed to be operational and rate of data growth on year to year basis.

According to an implementation, in order to implement application performance testing, a testing scenario is created, based on the testing environment and the test data. Further, as will be understood during the creation of the testing scenario, functional requirements can also be taken into account. Further, set up and configuration of test scripts can be achieved during creation of the testing scenario. Once the testing environment is determined and optimized, the test data generated, and the testing scenario simulated, tests are conducted for performance testing of the application, and the performance characteristics of the application are obtained. In an example, during testing, the application can be put through tests for stress performance, volume performance, endurance tests for performance, and for fail over performance.

Further, according to an implementation, the results of performance testing of the application, i.e., the performance characteristics, can be processed subsequent to the performance testing. In an example, the processing of the obtained performance characteristics can include extrapolating the performance characteristics for increased performance requirements, say for increased work load and data load. In addition, the performance characteristics can be extrapolated to obtain the performance characteristics for different environment sizes, say server sizes. Environment size can be understood as configuration of different components, such as servers, processors, memories, input-output resources, and network resources, in the environment for hosting the application.

Furthermore, benchmark performance characteristics can be determined for different performance requirements and for different environment sizes. In an implementation, during benchmarking, the variation of the performance characteristics with variations in the performance requirements and the variations in the environment sizes, and the impact of such variation on the performance characteristics, can be determined. According to an implementation, a deployment matrix can be created to capture the various combinations of performance characteristics and performance requirements, the variations, and the corresponding effect on the performance characteristics of the application. The deployment matrix, in an example, can be used for determining and identifying the combinations of performance requirements, the performance characteristics, and the corresponding environment size for deploying the application.

Further, upon deployment and launch of the application in a production environment, real-time performance characteristics of the application can be monitored. Further, based on the real-time performance characteristics, suggestions for modifications in configuration of the application or modifications in the settings of the environment components can be provided, for tuning and optimizing the performance of the application in the production environment. Also, the performance of the deployed application is monitored to identify hints of a potential problem in future, and can be avoided, for example, by taking preventive measures based on performance trends of the application.

While aspects of described systems and methods for assuring performance of applications can be implemented in any number of different systems, environments, and/or configurations, the embodiments are described in the context of the following system architecture(s).

Figure 1:
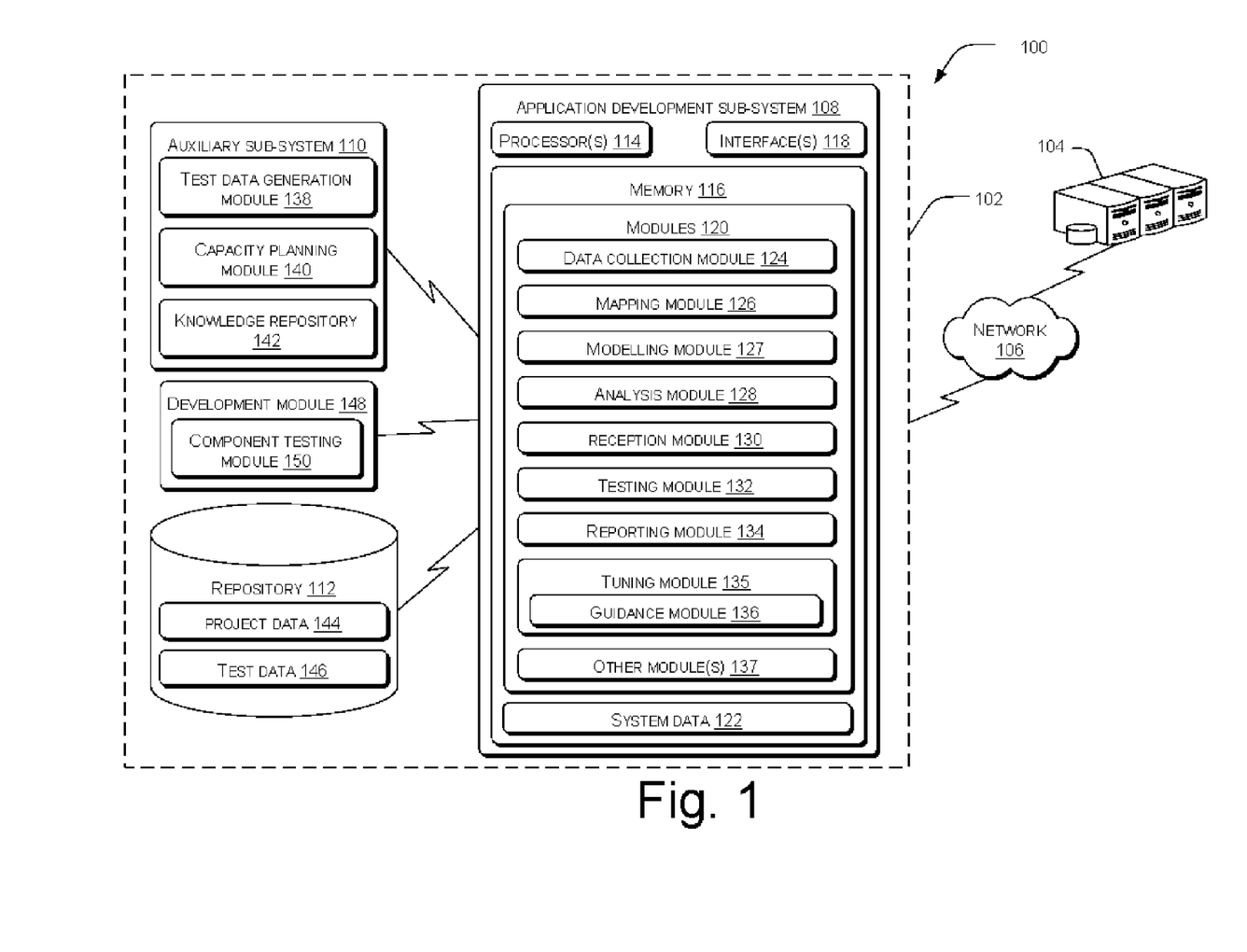
FIG. 1 illustrates a network environment implementing a performance assurance system for assuring performance of applications, in accordance with an implementation of the present subject matter.

FIG. 1 illustrates a network environment 100 implementing a performance assurance system 102 configured to achieve performance assurance of applications, according to an embodiment of the present subject matter. In said embodiment, the performance assurance system 102 is connected to and interacts with a customer system 104. The customer system 104 can be understood as a system implemented at the customer end, for example, financial institutions, hotels, departmental stores, and other such establishments, for which the application is to be developed. Hence, in one example, the customer system 104 can be a part of production environment in which the developed application is to be deployed and launched. The application can be deployed at the customer end to achieve various functionalities depending on the type of establishment that the application is deployed at. For example, the application may be used for accounting, bookkeeping, customer relationship management (CRM), enterprise resource planning (ERP), and transactions, at banks and other financial institutions. In another example, the application can be an entertainment application, say a music application or a web application. The customer system 104 may include, without limitation, servers, desktop computers, hand-held devices, laptops or other portable computers, network computers, mobile phones, multi-media enabled phones, or smart phones. Further, the customer system 104 can also be a customer system in development or quality analysis.

The performance assurance system 102 is connected to the customer system 104 over a network 106 through one or more communication links. The communication links between the performance assurance system 102 and the customer system 104 are enabled through a desired form of communication, for example, via dial-up modem connections, cable links, digital subscriber lines (DSL), wireless or satellite links, or any other suitable form of communication.

The network 106 may be a wireless network, wired network or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), to communicate with each other. Further, the network 106 may include a variety of network devices, including routers, bridges, servers, computing devices, storage devices.

In one implementation, the performance assurance system 102 includes an application development sub-system 108 connected to an auxiliary sub-system 110 and a repository 112. The application development sub-system 108 can be connected to the auxiliary sub-system 110, and the repository 112 through the communication links. The application development sub-system 108 and the auxiliary sub-system 110 may be implemented as any of a variety of computing devices, including, for example, servers, a desktop PC, a notebook or portable computer, a workstation, a mainframe computer, a mobile computing device, and an internet appliance. It will be understood that although the auxiliary sub-system 110, and the repository 112 are shown directly linked to the application development sub-system 108, the linking may be achieved through a network similar to the network 106.

The application development sub-system 108 can include processor(s) 114 coupled to a memory 116. The application development sub-system 108 further includes interface(s) 118, for example, to facilitate communication with the customer system 104, the auxiliary sub-system 110, and the repository 112. The interface(s) 118 may include a variety of software and hardware interfaces, for example, a web interface, a graphical user interface, allowing the application development sub-system 108 to interact with the customer system 104, the auxiliary system 110, and the repository 112. Further, the interface(s) 118 may enable the application development sub-system 108 to communicate with other computing devices, such as web servers and external data servers (not shown in figure). The interface(s) 118 can facilitate multiple communications within a wide variety of networks and protocol types, including wired networks, for example LAN, cable, and wireless networks such as WLAN, cellular, or satellite. The interface(s) 118 may include one or more ports for connecting the application development sub-system 108 to a number of devices to or to another server.

The processor(s) 114 may be implemented as one or more microprocessors, microcomputers, microcontrollers, digital signal processors, central processing units, state machines, logic circuitries, and/or any devices that manipulate signals based on operational instructions. Among other capabilities, the processor(s) 114 is configured to fetch and execute computer-readable instructions stored in the memory 116. The memory 116 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 116 includes module(s) 120 and system data 122. In one implementation, the module(s) 120 include a data collection module 124, a mapping module 126, a modelling module 127, an analysis module 128, a reception module 130, a testing module 132, a reporting module 134, a tuning module 135, and other module(s) 137. The other module(s) 137 may include programs or coded instructions that supplement applications or functions performed by the application development sub-system 108. Further, the tuning module 135 can include a guidance module 136.

The system data 122, amongst other things, may serve as a repository for storing data that is processed, received, or generated as a result of the execution of one or more modules in the module(s) 120.

The auxiliary sub-system 110 can include a test data generation module 138, a capacity planning module 140, and a knowledge repository 142. The knowledge repository 142, in an example, can include data relating to previous applications developed and performance tested by the performance assurance system 102. Although the auxiliary sub-system 110 is shown as a separate entity, it will be understood that the functionalities associated with the test data generation module 138 and the capacity planning module 140 can be incorporated in the application development sub-system 108. Further, the knowledge repository 142 can, alternately, reside on the repository 112 or system data 122, partially or completely.

The repository 112 can include project data 144 and test data 146. Although the repository 112 is shown external to the application development sub-system 108, it may be understood that the repository 112 can reside in application development sub-system 108. In such an implementation, the repository 112 can reside in the system data 122.

Further, according to an implementation, the application development sub-system 108 can be connected to a development module 148. Although shown external to the application sub-system 108, the development module 148 can reside inside the application development sub-system 108. Alternatively, the development module 148 can reside external to the performance assurance system 102, for example, on a third-party application development device (not shown). Further, the development module 148 can be connected with the application development sub-system 108 through a network similar to the network 106. In an implementation, the development module 148 includes a component testing module 150.

In operation, the performance assurance system 102 is configured to assuring performance of applications for the customer system 104. To achieve such performance assurance of applications, the performance assurance system 102 can propagate performance assurance across various stages of development life cycle of the application. According to an implementation, performance assurance system 102 can architect the application to incorporate functionalities associated with performance requirements provided by the customer system 104.

Accordingly, in an implementation, the data collection module 124 in the application development-sub system 108 can be configured to obtain one or more performance requirements. In said implementation, the data collection module 124 can obtain the performance requirements in a pre-development phase of the development lifecycle of the application. Hence, it can be understood that when the data collection module 124 collects the performance requirements associated with the application, before the actual development of the application is achieved.

In an example, the data collection module 124 can request for the performance requirements from the customer system 104. In another example, the performance assurance system 102 can be connected to a plurality of user devices (not shown in figure) and the data collection module 124 can request performance requirements from the user devices. The data collection module 124 can obtain the performance requirements and store the performance requirements in the project data 144 in the repository 112. In yet another example, the data collection module 124 can obtain performance requirements based on rules predefined by a user. Say, the data collection module 124 can be configured to obtain the performance requirements on previously obtained performance requirements for a similar application, stored previously in the project data 144.

In an implementation, the performance requirements can include operational load characteristics associated with the application, such as work load characteristics and data load characteristics, key transaction characteristics, and batch job characteristics. For example, the work load characteristics associated with the application can include total number of users that the application is expected to cater to; types and categories of users, say heavy users and light users of the application and the number of users falling under each of the types and categories; average number of concurrent users accessing the application; peak usage of the application over a period, say monthly, quarterly, weekly, and seasonally; and anticipated year-on-year growth in number of users of the application.

Further, data load characteristics of the application to be developed can include volume of data expected to be handled by the application for key entities or users of the application and the anticipated year-on-year increase in the number of key entities. The key transaction characteristics of the application can include, for example, volume of transactions expected to be handled by the application annually and during peak seasons, year-on-year growth in the volume of transactions anticipated, and the acceptable response time for the application for a transaction to complete.

The batch job characteristics can include acceptable time window for completion of a batch job by the application, anticipated processing window for the application, and expected execution summary of batch jobs, for example, parallel or sequential, and whether the application will carry out online functionalities a batch job is being processed Additionally, the performance requirements can include expected service period of the application, expected availability of the application, acceptable utilization of processing power and memory by the application, expected network bandwidth that would be utilized by the application, and data retention period for master data and transaction data.

Once the performance requirements have been obtained and stored in the project data 144 in the repository 112, the mapping module 126 achieves a mapping of the performance requirements with one or more functional requirements associated with the application. In a similar manner as explained with reference to performance requirements, the mapping module 126 can obtain and store the functional requirements associated with the application in the project data 144. The functional requirements can include requirements related to the actual purpose and functionalities related to the application. For example, for a web application to book travel tickets, the functional requirements include successfully booking a travel ticket and sending a confirmation message on an email address of the buyer, while a corresponding performance requirement for the web application can be that the response time for the complete transaction should not exceed 9 seconds. Hence, it can be understood that the mapping module 126 can translate the performance requirements into functional requirements, linking the performance requirements with the one or more functionalities of the application responsible for fulfilling those performance requirements.

In an implementation, to achieve the mapping of the performance requirements and the functional requirements of the application, the mapping module 126 can be configured to create a list of use cases for the application, for example, online transactions and reports and batch jobs. Further, the mapping module 126 can determine the frequency of execution and the complexity associated with each use case, and also determines primary use cases, for which the application would be used more often. For example, the mapping module 126 can ignore the use cases having simple functionality, infrequent usage, and low data exchange, and include the use cases for which the usage frequency is high, have high complexity, and usually have high response time. The mapping module 126 can also include all the batch jobs, and reports executed along with the transactions. In addition, according to an implementation, the mapping module 126 can be configured to derive a target throughput, a target number of concurrent users, and a target response time window, for the application, based on the mapping of the performance and functional requirements. The mapping module 126 can be configured to store the data relating to the mapping of the performance and functional requirements in the system data 122.

Further, the analysis module 128 is configured to analyze the performance requirements against operational load expected to be handled by the application after deployment. As mentioned earlier, the operational load can include data load as well as work toad. For example, the analysis module 128 can analyze the performance requirements against the operational load, say to associate the operational load with the performance requirements and to estimate operational load that would be handled by the application in varying situations. Further, the modelling module 127 can be configured to obtain an entity-relationship design and determine the design and architecture of the database associated with the application. In an implementation, the analysis module 128 can create a list of all the key entities associated with each transaction to be executed by the application and also determine the size of each entity. Further, based on the number of various transactions to be handled by the application, the entity-relationship design, and year-on-year growth of each key entity, the analysis module 128 can compute an anticipated size of data associated with each key entity in the design. Further, as a result of the above analysis, the analysis module 128 can estimate the operational load that the application would be expected to handle during an end phase of the service term. The analysis module 128 can store the results of the analysis in the system data 122.

Once the analysis is complete, the processing related to the performance and functional requirements provided by, for example, the customer system 104, and associated with the application is also completed. Further, the development module 148 is configured to develop the application based on the performance and functional requirements, the mapping thereof, and the entity relationship design and estimations made by the analysis module 128. In an implementation, the development module 148 is configured to access the data related to the performance and functional requirements in the project data 144, the data related to the mapping between the requirements and the data related to the operational load analysis in the system data 122, and design and produce the application.

According to an implementation, the development module 148 is configured to first design the application, and then to take the application into construction phase. During the design phase, the development module 148 can obtain and review a detailed design of the application to achieve optimized performance, in relation to the performance requirements laid down for the application. For example, the development module 148 can identify settings and configuration for each of functional component of the application to be developed; estimate the number of records to be returned by the application for each query, and in case the number of records is large, the development module 148 may implement a memory management technique, such as paging, in the application to handle the large number; and also analyze queries to be handled by the application, say using a structure query language (SQL) query analyzer.

Further, the development module 148 can design the application so that the performance is not affected even during partial inputs, minimal database operations are required by the application, and caching of small entities and of large entities, say those which are part of the master data, is achieved during operation of the application. In addition, in the design phase, the development module 148 can identify and implement database indexes for the database associated with the application and externalize static content on web servers on which the application is to be deployed.

Subsequent to the design phase, the development module 148 achieves the construction and development of the application. According to an aspect of the present subject matter, the development module 148 can be configured to develop the application based on best practices for performance, for example, ensure that the SQL database operations are adhered to by the application. The rules related to the development of the application and the best practices can be stored in the system data 122 and accessed by the development module 148 during the construction phase. According to an implementation, the development module 148 can be configured to construct individual components of the application during the construction phase and then integrate the individual components of the application together to develop the application.

Further, during the construction phase, the development module 148 can ensure that the database associated with the application during development phase has a predefined amount of load during production of the application. For example, the database has at least 25% of the anticipated operational load during production of the application. The development module 148 can achieve static code analysis using, for example, preconfigured rules, for performance assurance and can implement performance logging for business services and SQL query and database operations.

Further, the development module 148 can be configured to implement testing of individual components of the application and automation in continuous integration type of application set-up, perform a daily review of the results of the testing of components of the application, and take corrective actions during the construction of the application in case any issues are encountered. According to an implementation, the component testing module 150 is configured to test the individual components of the application for performance. Hence, each individual component is performance tested before being integrated into the application, for performance assurance. In an example, the component testing module 150 can analyze and check the individual components for response time of functions related to the component and the response time of the queries. In said implementation, the development module 148 can be implemented to achieve testing of the individual application components to determine the scalability of the functionalities of the application.

Upon completion of the development of the application, the reception module 130 can request the development module 148 to provide the developed application. The reception module 130 can store the developed application in the system data 122. Further, the testing module 132 tests the application for performance. In order to test the application, the testing module 132 first determines a testing environment for hosting the application. During the determination of the testing environment, the testing module 132 identifies an optimal configuration of the infrastructure required for supporting the application during operation. In case the application includes various independent components working in tandem, then the testing module 132 can optimize the testing environment for each of the components of the application.

During the determination of the testing environment, the testing module 132 can configure the testing environment which is similar to the production environment where the application is to be deployed and launched. In an example, the testing module 132 can configure the testing environment to have settings and configurations which are about 50% of the production environment. Further, the testing module 132 can tune the settings of the components of the testing environment, such as the web servers, application servers, database servers, email servers, and databases, for optimized performance of the components. For example, the settings of the various components can include thread pool size for the web server, database connected pool size for the application server, number of virtual instances of the application running on the web server, table space sizing and other key parameters relating to the databases. In an example, in case a java-based server is employed in the testing environment, then the testing module 132 can implement the java-based server in a heap configuration. The various parameters and details related to the testing environment and the production environment are stored in the system data 122.

Further, as a prerequisite to carry out the testing of the application, test data to be used for testing is generated. In an implementation, the test data generation module 138 in the auxiliary sub-system 110 generates the test data. In said implementation, the test data generation module 138 can generate the test data based on the operational load previously determined by the data collection module 124 based on the design of data structure and the results of analysis of the performance requirements against the operational load achieved by the analysis module 128. Accordingly, the test data generation module 138 can access the project data 144 and the system data 122 for generating the test data.

Further, the test data generation module 138 can identify seed data for each unique transaction that would be executed by the application, and in one implementation, generate test data based on the seed data, taking into account the operational loads expected and anticipated to be handled by the application. After the test data is generated, the test data generation module 138 can review the test data for sanity. Further, the test data generation module 138 can also be configured to implement back-up and restoration of the generated test data for re-using the data in the next iteration of testing without having the need of re-creating data. The policies for back-up and storage of test data can be, in an example, configured by an administrator of the performance assurance system 102 and be stored in the test data 146. Further, the test data generation module 138 can store the generated data in the test data 146.

Further, the testing module 132, in order to test the developed application, simulates a testing scenario. In an example, the testing module 132 can simulate the testing scenario using the work load and data load characteristics associated with the application and automating a predefined test script based on such characteristics. The testing module 132 can identify various testing scenarios and select and simulate one of the testing scenarios, the testing scenario selected based on predefined rules stored in the system data 122. The simulation of the testing scenario incorporates an approach to test the various functionalities associated with the application, preparation of test scripts for running the performance tests for the application, parametrizing scripts for input test data by defining parameters affecting the test data to be provided as input to the application during testing, and validating the test scripts. The data associated with the simulation of the testing scenario is stored in the test data 146.

Once the testing environment has been identified, the test data generated, and the testing scenario simulated, the testing module 132 carries out the testing of the application for performance using the aforementioned. During the testing of the application, the testing module 132 can determine and analyze performance characteristics of the application. The performance characteristics can include, for example, the response times for the transactions carried out by the application, response times for database queries, number of transactions completed per second for batch jobs, throughput of the system running the application, utilization of system resources, such as processor, memory, say RAM, and input and output resources, number of application instances executing concurrently, and number of physical servers hosting the application at various instances during testing. Further, the testing module 132 can conduct health check of the servers with respect to the system resources, for example, the processing ability, memory, and input-output resources associated with the environment.

In an implementation, after the testing of the application, the testing module 132 can validate the performance of the application for various parameters. For example, the performance testing of the application can include, in addition to the parameters mentioned before, endurance testing in which the application is tested to find problems that grow over a period of time by repetitive and continuous operation of the application and stress testing in which the application is tested for the maximum load of operation or users that the application can support before breakdown. Further, other types of testing of the application can include volume performance which includes testing of the application for growth in operational load over a period of time, and fail over testing in which the application is tested with partial availability of servers to check for proper load balancing by the application.

The testing module 132 further measures the performance characteristics of the tested application against desired performance characteristics of the application. In an example, the testing module 132 can determine the desired performance characteristics of the application based on the performance requirements and the functional requirements obtained and stored in the project data 144. In case, the performance characteristics of the application do not meet the desired performance characteristics, then the application is tuned and iteratively tested until the application meets the desired performance characteristics.

Further, when the performance characteristics of the application meet the desired characteristics, the reporting module 134 can process the performance characteristics of the application are processed further. The further processing of the performance characteristics of the application can be done to, for example, extrapolate the results and for benchmarking the results for different situations. In certain cases, during testing, the testing module 132 may not be able to allocate the requisite server capacity to run the application. For the test conducted in such circumstances, the reporting module 134 can extrapolate the results of the test and obtain the performance characteristics of the application for the testing environment and also for the actual production environment. In an implementation, the reporting module 134 can achieve the extrapolation of the performance characteristics for an increased performance requirement, such as operational load or server capacity, keeping the other performance requirements constant. The rules for carrying out extrapolation of the performance characteristics are stored in the system data 122.

According to an implementation, the reporting module 134 can generate a performance report of the performance characteristics of the application, and also include the extrapolated performance characteristics in the performance report. The performance report can also include the performance requirements and the environment details. In an example, the reporting module 134 can provide the performance report to the user devices connected to the performance assurance system 102. In another example, the performance report can be provided to the customer system 104. In the above examples, the reporting module 134 can be configured to push the performance reports to the user devices or the customer system 104, or may send the performance reports after receiving a report request from the user devices or the customer system 104.

Additionally, benchmark performance characteristics are identified for the application, based on the performance characteristics obtained after testing or those obtained after extrapolating. During the benchmarking performance characteristics, the reporting module 134 can collate performance characteristics of the application for varying performance requirements, for example, user load or work load, data load, and server capacity, and determine the impact of such variation on the performance characteristics. In an implementation, the reporting module 132 can allocate a benchmark number to the application for each combination of the performance requirements and performance characteristics, and store the benchmark number in the system data 122.

Further, after achieving extrapolation of the performance characteristics for the application, the capacity planning module 140 can be configured to further generate a deployment matrix for the application by, for example, computing production environment size for the application and for scaling the application in order to operate at increased loads. Hence, in an implementation, the deployment matrix for the application is indicative of various production environments in which the application can be launched and the corresponding performance characteristics of the application in each of the production environments.

In an implementation, during the generation of the deployment matrix, the capacity planning module 140 can compute the production environment size based on forecast and anticipated use of the application and the performance characteristics. In an example, during environment sizing, the capacity planning module 140 can achieve database sizing, memory sizing, connection pool sizing, strategy for horizontal and vertical scaling of the application for increased operational load and for increased capacity, and also a strategy for handling the impact of scaling on the application.

Additionally, according to an implementation of the present subject matter, the reporting module 134 is configured to obtain a performance certification for the application. In an example, the performance certification can be included as part of the deployment matrix. In an implementation, performance certification of the application can include associating the performance characteristics, such as performance benchmark number, environment sizing needs, operational loads, and the list of use-cases determined for the application, with the application, for every combination of performance characteristics and performance requirements.

Subsequently, upon the completion of testing and benchmarking of the application, the application is deployed in a production environment, with the appropriate modifications based on the environment size of the production environment. In an example, the performance characteristics corresponding to the environment size can be determined from the deployment matrix or can be computed based on the information in the performance matrix.

Further, after the deployment and launch of the application in the production environment, the tuning module 135 can monitor real-time performance of the application in the production environment and provide for tuning of the application for improved performance characteristics and preventing future performance issues. For example, in the production environment, the tuning module 135 can record performance characteristics associated with the application when the application is running, analyze the usage patterns and the corresponding performance pattern of the application.

In said example, the performance characteristics associated with the application with respect to the production environment can include processor utilization, memory utilization input output statistics, change in capacity of network connectivity, disk space utilization at the time of execution, response time during different transactions, batch jobs, and simultaneous report generation, response time during database operations, thread heap utilization, garbage collection pattern. Further, other parameters influencing the performance of the application in the production environment, and which can be considered by the performance assurance system 102 at the time of tuning, can include actual growth in operational load for the application and response sizes for the application. The usage patterns for the application can include day-wise, hour-wise, week-wise, organization wise usage of the application.

Further, the guidance module 136 can suggest deployment settings, solution design, or environment size, for improving the performance of the application. In one example, the deployment and configuration strategies, which the guidance module 136 may suggest, can be heap configurations and connecting sizes. Additionally, the guidance module 136 can also suggest code refactoring, changes in the database, denormalization, and suggestions relating to running new instances of the application in cases of failure. In an implementation, the guidance module 136 can access the knowledge repository to achieve troubleshooting when the application is in the post-deployment phase. It will be understood that such analysis can be similarly carried out during testing of the application in the pre-deployment phase.

Figure 2:
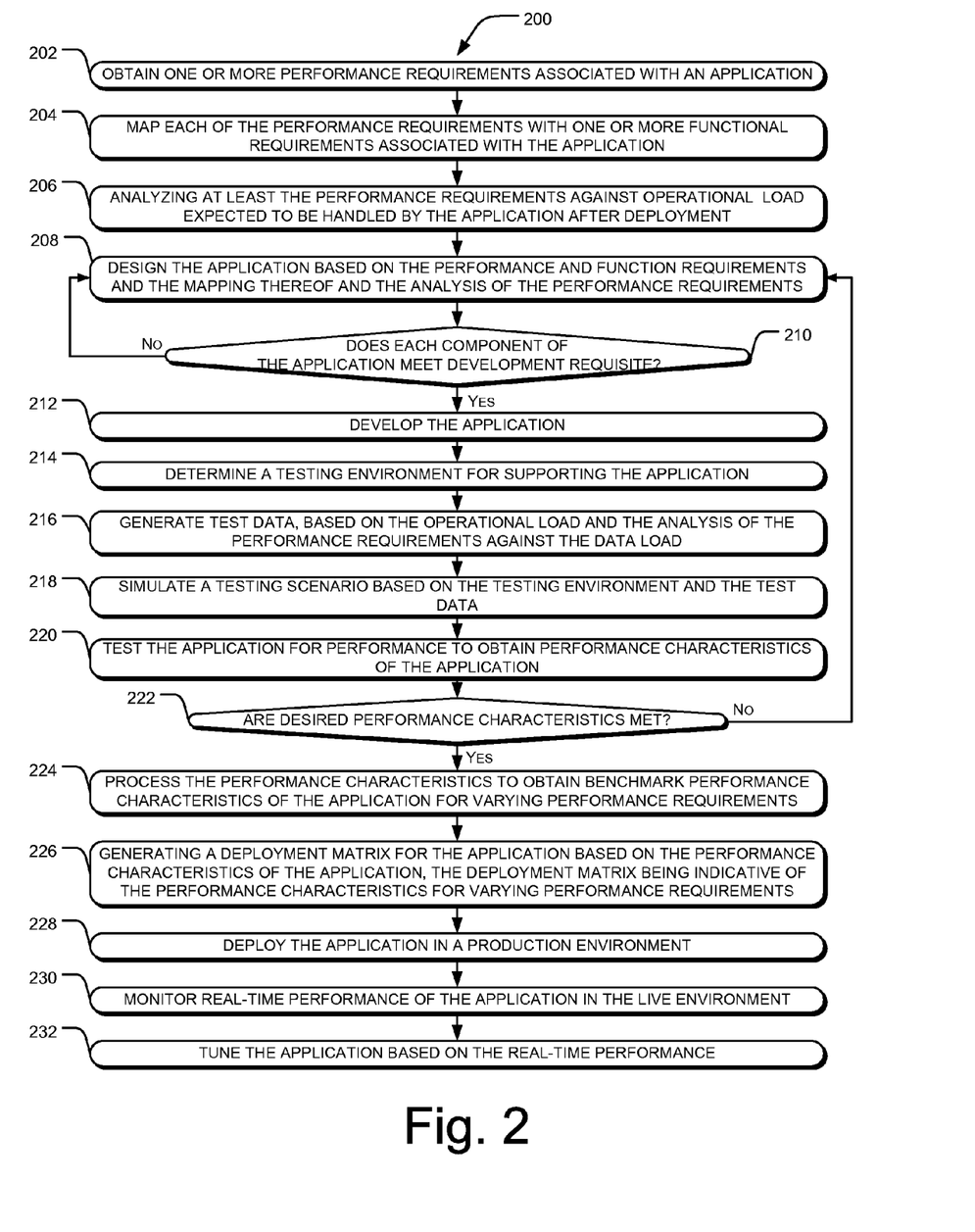
FIG. 2 illustrates a method for assuring performance of applications, in accordance with an implementation of the present subject matter.

FIG. 2 illustrates a method 200 for assuring performance of applications, according to an implementation of the present subject matter. Although, description for the method 200 is provided below with reference to the performance assurance system 102 and its various components, it will be understood that the method 200 can be carried out by other systems and devices.

The method 200 may be described in the general context of computer executable instructions embodied on a computer-readable medium. Generally, computer executable instructions can include routines, programs, objects, components, data structures, procedures, modules, functions, which perform particular functions or implement particular abstract data types. The method 200 may also be practiced in a distributed computing environment where functions are performed by remote processing devices that are linked through a communications network. In a distributed computing environment, computer executable instructions may be located in both the local and the remote computer storage media, including memory storage devices.

The order in which the method 200 is described is not intended to be construed as a limitation, and any number of the described method blocks can be combined in any order to implement the method 200, or an alternative method. Additionally, individual blocks may be deleted from the method 200 without departing from the spirit and scope of the methods, systems and devices described herein. Furthermore, the method 200 can be implemented in any suitable hardware, software, firmware, or combination thereof.

With reference to the description of FIG. 2, for the sake of brevity, the details of performance assurance of applications and the components of the performance assurance system 102 are not discussed here. Such details can be understood as provided in the description provided with reference to FIG. 1.

Referring to FIG. 2, at block 202, one or more performance requirements associated with an application to be developed, are obtained. In an example, the performance requirements can include operational load characteristics, say characteristics related to work load and data load, key transaction characteristics, and batch job characteristics, associated with the application to be developed. Additionally, the performance requirements include expected service period of the application after deployment, expected availability of the application, acceptable utilization of system resources, such as processing power, memory, and network bandwidth, by the application during operation, and data retention period for the application with reference to different types of data. In an implementation, the performance requirements are obtained by the data collection module 124 of the application development sub-system 108.

At block 204, each of the performance requirements obtained at block 202 are mapped with one or more functional requirements associated with the application. The functional requirements can include requirements of a customer relating to the actual purpose and objective of the application. At block 204, the mapping of the performance requirements and the functional requirements can be achieved. In an example, the mapping of the performance and functional requirements can be done to associate each performance requirement to those functional aspects of the application which affect that performance requirement of the application. In an implementation, a list of use cases for the application can be created and the complexity and frequency of execution associated with each use case, and primary use cases among the list of use cases, can be determined. The use cases can be understood to be based on the functional requirements of the application, along with being based on other parameters. Hence, upon the association of the list of use cases with the performance requirements, the functional requirements are associated with the performance requirements.

At block 206, the performance requirements are analyzed against operational load expected to be handled by the application during operation. The operational load can include data load, and work load or load related to the users of the application. In an example, during the analysis of the performance requirements against the operational load, an estimate of the data associated with various entities handled by the application is computed. For example, a list of key entities associated with the application and the size of each entity is determined. Further, in an implementation, the analysis of the performance requirements with respect to the operational load can be achieved for obtaining an entity-relationship design for the application and for determining a design of databases associated with the application. Based on the entity-relationship design and an estimated increase in the amount data handled by the application, the operational load expected to be handled by the application by the end of the service period of the application can be determined.

Once the analysis is done, at block 208, the application is put through design and construction phase, the application being designed based on the performance requirements, the functional requirements, the mapping achieved at block 204, and the analysis achieved at block 206. In an implementation, during the development of the application, the application is first put through the design phase and subsequently through the construction phase. In the design phase, a detailed design of the application for optimized performance, based on the performance and functional requirements, is achieved, and the design reviewed in relation to the performance requirements. Further, during the review of the design, various suggestions and inputs regarding implementation and configurations of the application can be provided and employed in the application. During the design phase, in an implementation, individual components of the application are designed and a design for integration of the components into the complete application is also achieved.

Upon completion of the design phase, the application is constructed, in an implementation, individual components of the application, for which the designing is done, are constructed. Since the construction is based on the design, which in turn is based on the performance requirements, the individual components of the application assure performance during operation of the application. For example, static code analysis of the application can be implemented for performance assurance, during the construction of the components of the application.

At block 210, it is determined whether each component of the application, constructed in the step implemented in block 208, meets development requisite. In an example, the development requisite can include threshold values of response time for the component of the application and response time of the queries from the database associated with the application component. In case the development requisite is not met by one or more of the individual components of the application ('No' path from block 210), then the design of the application is re-engineered and the components re-constructed, iteratively, until each component of the application meets the development requisite.

Once all the individual components of the application have been constructed to meet the development requisite ('Yes' path from block 210), then at block 212, the application is developed. According to an implementation, the application is developed by integrating the individual components to function as a single unit.

Further, the application is tested for performance. For testing the application, at block 214, a testing environment for hosting and testing the application is determined. The determining the testing environment can also include identifying an optimal configuration of the various components in the environment for hosting the application. In an implementation, the testing environment configured for supporting the application during testing is similar to the production environment where the application is to be deployed. For example, the components in the testing environment can be configured to perform with about 50% of the settings of the production environment.

Subsequent to the determination and configuration of the testing environment, for testing the application, at block 216, test data for testing the application can be generated, based on the expected operational load on the application and the analysis of the performance requirements with reference to the expected operational load. For example, the estimated increase in the operational load on the application during the service period can be one of the bases for the generation of test data. Further, after the generation of the test data, the test data can be reviewed for sanity, and then backed-up for later use.

Further, at block 218, a testing scenario for carrying out the performance testing of the application can be simulated, based on the testing environment determined at block 214 and the test data generated at block 216. In addition, the testing scenario can be simulated based on the performance requirements, such as operational load characteristics, and the batch job characteristics, associated with the application. In an implementation, the simulation of the testing scenario can be achieved such that the testing scenario incorporates performance testing and validation of various functionalities associated with the application. In an example, simulation of the testing scenario can include preparation of test scripts, parameterization of scripts by defining parameters that influence the test data, and validating the test scripts.

With the completion of the simulation of the testing scenario at block 218, the equipment for testing the application is obtained. Hence, at block 220, the application is tested for performance, to obtain one or more performance characteristics of the application. In an example, the performance characteristics of the application can include the response times for the transactions achieved using the application; the response times for reverting to database queries; number of transactions completed per second for batch jobs; throughput of the environment running the application; utilization of system resources, such as processor, memory, input-output resources, and network bandwidth, by the application. Additionally, the performance characteristics of the application can also include the number of instances of the application running concurrently, number of physical servers supporting the application at a given instance, in an implementation, a health of the various components of the environment, such as the processor, the memory, and the input-output interfaces, is achieved and analyzed during testing of the application.

In addition to the foregoing, during testing, the application can be tested for endurance performance, loading performance, stress performance, volume performance, and fail over performance. The details of such performance testing can be understood to be the same as those described with reference to FIG. 1.

Upon completion of testing, at block 222, it is determined whether the performance characteristics of the application meet the desired performance characteristics. In an example, the desired performance characteristics can be determined based on the performance and functional requirements determined at block 202, and associated with the application, and also on the basis of the production environment in which the application is to be deployed. In case the performance characteristics of the application do not meet the desired performance characteristics ('No' path from block 222), application is tuned and modified and tested again. For example, the mapping of the functional and performance requirements can be modified in order to achieve better performance of the application. Hence, the method steps from block 208 to 220 are executed iteratively, until the performance characteristics of the application meet the desired performance characteristics.

When the performance characteristics of the application meet the desired performance characteristics ('Yes' path from block 222), then at block 224, the performance characteristics are processed further to obtain performance characteristics for different deployment environment scenarios. For example, in case the server capacity available for testing is less than the server capacity required in the production environment. In such a case, the results of testing, i.e., the performance characteristics of the application are processed to obtain the performance characteristics of the application at the specified server capacity of the production environment. In an implementation, the results of the performance of the application for a certain environment are extrapolated for another environment, by changing the parameters differing in the two environments. Further, the performance characteristics of the application for increased load and scalability can also be obtained by processing the performance characteristics.

According to an implementation, a performance report based on the performance characteristics of the application can be generated at block 224. The performance report may also include the extrapolated performance characteristics. The performance report can also include the performance requirements and the environment details. In addition, at block 224, benchmark performance characteristics of the application can also be identified for different environments. During benchmarking the performance characteristics, the performance characteristics for varying operational loads, and varying server capacities, can be collated, and the impact of such variation on the performance characteristics are determined.

Subsequently, at block 226, a deployment matrix is generated based on the processing of the performance characteristics obtained at block 226. The deployment matrix can be indicative of the performance requirements associated with the application and the variation of the performance characteristics with the variation in the performance requirements. Further, the deployment matrix can be used for determining the environment, say the environment size, for supporting the application for a certain set of performance requirements and the impact on the environment size with the variation in the performance requirements, based on the variation of the performance characteristics of the application. Such a matrix facilitates in strategizing and determining the environment for scaling the application and also for strategizing the course of action to handle the impact of scaling on the application.

At block 228, the application is deployed in a production environment, for example, at the customer system 104. The production environment for launching the application can be, in an example, selected and configured based on the deployment matrix.

Subsequently, at block 230, the real-time performance of the application is monitored in live environment or the production environment. In one example, for monitoring the real-time performance of the application, performance characteristics associated with the application when the application is running can be recorded, usage patterns of environment resources can be analyzed, and the corresponding performance pattern of the application can be determined.

Further at block 232, based on the real-time performance, the application is tuned for high performance operation. In an example, during the tuning the application, suggestions for improving performance of the application during operation can be provided. In an example, the suggestions can include changes in configurations and settings of the components of the production environment, say heap configurations, and changes in the application, say code refactoring.

Although implementations for assuring performance of applications have been described in language specific to structural features and/or methods, it is to be understood that the present subject matter (and not appended claims) is not necessarily limited to the specific features or methods described. Rather, the specific features and methods for assuring performance of applications are disclosed as implementations of the present invention.

We claim:

1. A computer implemented method for assuring performance of an application across various stages of development life cycle of the application, the method comprising:

obtaining, by a processor, at least one performance requirement associated with the application in a pre-development phase of the development lifecycle of the application, wherein the at least one performance requirement is indicative of qualitative performance of the application, the at least one performance requirement comprises at least one of operational load characteristics associated with the application, key transaction characteristics associated with the application, batch job characteristics associated with the application, expected service period of the application, expected availability of the application for operation, acceptable utilization of system resources by the application during operation, and data retention period for the application;

mapping, by the processor, the performance requirement with one or more functional requirements associated with the application to link the performance requirement with the one or more functional requirements, the mapping being achieved in the pre-development phase of the development lifecycle of the application, the pre-development phase being before a design phase and a construction phase, wherein the mapping comprises, creating a list of use cases for the application;

selecting a set of primary use cases from the list of use cases for mapping the performance requirement with the one or more functional requirement;

analyzing, by the processor, the performance requirement against at least an operational load expected to be handled by the application during operation;

developing, by the processor, the application based on the performance requirement, the mapping, and the analyzing;

determining, by the processor, a plurality of performance characteristics associated with the application in response to testing of the application to compare against desired performance characteristics for assuring performance of the application during operation, the desired performance characteristics being based on the performance requirement and the one or more functional requirement, wherein the plurality of performance characteristics are indicative of quantitative performance of the application, the plurality of performance characteristics comprising response times for transactions carried out by the application, response times for database queries, number of transactions completed per second for batch jobs, throughput of a system hosting and running the application, utilization of system resources and input and output resources by the application, number of application instances executing concurrently, and number of physical servers hosting the application at various instances during testing;

processing, by the processor, based on the comparison, the plurality of performance characteristics to obtain performance characteristics of the application for varying performance requirements in a pre-deployment stage, wherein the processing comprises generating a deployment matrix for the application to indicate the plurality of performance characteristics of the application for varying performance requirements, the plurality of performance characteristics being determined for varying performance requirements by extrapolating the plurality of performance characteristics; and deploying the application in a production environment in response to the processing.

2. The computer-implemented method as claimed in claim 1, wherein the determining the performance characteristic comprises:

determining a testing environment for hosting the application;

generating test data for testing the application, wherein the generation of test data is based on the analysis of performance requirement; and simulating, based on the testing environment and the test data, a test scenario for testing the application to obtain the plurality of performance characteristics.

3. The computer-implemented method as claimed in claim 1 further comprising monitoring, by the processor, one or more real-time performance characteristics of the application post-deployment to tune the application based on the real-time performance characteristics.

4. The computer-implemented method as claimed in claim 1, wherein the developing the application comprises:

designing individual components of the application, based on the performance requirement and the mapping;

constructing each of the individual components based on the designing;

determining whether each of the individual components meets development requisite; and develop the application from the individual components, based on the determining.

5. An application development sub-system for assuring performance of an application across various stages of development life cycle of the application, the application development sub-system comprising:

a processor; and a memory coupled to the processor, the memory comprising, a data collection module configured to obtain at least one performance requirement associated with the application, wherein the performance requirement is obtained in a pre-development stage of application development, wherein the at least one performance requirement is indicative of qualitative performance of the application, the at least one performance requirement comprises at least one of operational load characteristics associated with the application, key transaction characteristics associated with the application, batch job characteristics associated with the application, expected service period of the application, expected availability of the application for operation, acceptable utilization of system resources by the application during operation, and data retention period for the application;

an analysis module configured to analyze the performance requirement against an operational load expected to be handled by the application in a post-deployment stage;

a mapping module configured to associate the performance requirement with at least one functional requirement associated with the application, wherein the application is developed based on the performance requirement, the functional requirement, the association thereof, and the analysis, the mapping module associating the performance requirement with at least one functional requirement in the pre-development phase of the development lifecycle of the application, the pre-development phase being before a design phase and a construction phase, wherein the mapping module, creates a list of use cases for the application;

selects a set of primary use cases from the list of use cases for mapping the performance requirement with the one or more functional requirement;

a development module to develop the application based on the performance requirement, the functional requirement, the association thereof achieved by the mapping module, and the analysis by the analysis module;

a testing module configured to test the application to obtain a plurality of performance characteristics of the application to determine, based on the performance requirement, whether the performance characteristics of the application meet a desired performance characteristics, the desired performance characteristics being based on the performance requirement and the one or more functional requirement, wherein the plurality of performance characteristics are indicative of quantitative performance of the application, the plurality of performance characteristics comprising response times for transactions carried out by the application, response times for database queries, number of transactions completed per second for batch jobs, throughput of a system hosting and running the application, utilization of system resources and input and output resources by the application, number of application instances executing concurrently, and number of physical servers hosting the application at various instances during testing;

a reporting module configured to process the plurality of performance characteristics, based on the determining by the testing module, the plurality of performance characteristics to obtain performance characteristics of the application for varying performance requirements in a pre-deployment stage; and a capacity planning module to generate a deployment matrix for the application to indicate the plurality of performance characteristics of the application for varying performance requirements based on the processing by the reporting module, the plurality of performance characteristics being determined for varying performance requirements by extrapolating the plurality of performance characteristics, wherein the application is deployed in a production environment in response to the deployment matrix.

6. The application development sub-system as claimed in claim 5 connected to an auxiliary sub-system to obtain test data, wherein the auxiliary sub-system comprises a test data generation module configured to generate the test data, based on the operational load and the analysis of the performance requirement against the operational load, for testing the application.

7. The application development sub-system as claimed in claim 5, wherein the testing module is further configured to:
   determine a testing environment for hosting the application for testing; and
   simulating a testing scenario for testing the application, based on the testing environment and test data generated for testing the application.

8. The application development sub-system as claimed in claim 5, wherein the reporting module is further configured to identify benchmark performance characteristics of the application for the varying performance requirements.

9. The application development sub-system as claimed in claim 5, wherein the reporting module is configured to achieve a performance certification of the application for the varying performance requirements.

10. The application development sub-system as claimed in claim 5, further comprising a modeling module configured to determine a design of a database associated with the application, based on the association of the performance requirement with the functional requirement.

11. The application development sub-system as claimed in claim 5, further comprising a tuning module configured to monitor one or more real-time performance characteristics of the application in a post-deployment stage, to tune real-time performance of the application, based on the real-time performance characteristics.

12. The application development sub-system as claimed in claim 11, wherein the tuning module comprises a guidance module configured to provide one or more suggestions from a knowledge repository, to tune the real-time performance of the application.

13. A non-transitory computer-readable medium having embodied thereon a computer program for executing a method for assuring performance of an application across various stages of development life cycle of the application, the method comprising:
   collecting at least one performance requirement associated with the application, wherein the collection is achieved in a pre-development stage of the application, wherein the at least one performance requirement is indicative of qualitative performance of the application, the at least one performance requirement comprises at least one of operational load characteristics associated with the application, key transaction characteristics associated with the application, batch job characteristics associated with the application, expected service period of the application, expected availability of the application for operation, acceptable utilization of system resources by the application during operation, and data retention period for the application;
   mapping the performance requirement with one or more functional requirements associated with the application to link the performance requirement with the one or more functional requirements, the mapping being achieved in the pre-development phase of the development lifecycle of the application, the pre-development phase being before a design phase and a construction phase, wherein the mapping comprises,
      creating a list of use cases for the application; and
      selecting a set of primary use cases from the list of use cases for mapping the performance requirement with the one or more functional requirement;
   analyzing the performance requirement with respect to an operational load expected to be handled by the application during operation;
   developing the application based on the performance requirements, the functional requirements, the mapping, and the analysis;
   testing the application to obtain a plurality of performance characteristics of the application, wherein the plurality of performance characteristics are indicative of quantitative performance of the application, the plurality of performance characteristics comprising response times for transactions carried out by the application, response times for database queries, number of transactions completed per second for batch jobs, throughput of a system hosting and running the application, utilization of system resources and input and output resources by the application, number of application instances executing concurrently, and number of physical servers hosting the application at various instances during testing;
   comparing the performance characteristic of the application with a desired performance characteristic for assuring performance of the application during operation, the desired performance characteristics being based on the performance requirement and the one or more functional requirement;
   processing, based on the comparison, the plurality of performance characteristics to obtain performance characteristics of the application for varying performance requirements in a pre-deployment stage, wherein the processing comprises generating a deployment matrix for the application to indicate the plurality of performance characteristics of the application for varying performance requirements, the plurality of performance characteristics being determined for varying performance requirements by extrapolating the plurality of performance characteristics; and
   deploying the application in a production environment in response to the processing.

* * * * *